United States Patent [19]
Ingram et al.

[11] 3,844,625
[45] Oct. 29, 1974

[54] FLUID PRESSURE BRAKING FOR VEHICLES

[75] Inventors: Brian Ingram, Balsall; David Anthony Harries, Shirley, both of England

[73] Assignee: Girling Limited, Birmingham, England

[22] Filed: Sept. 10, 1973

[21] Appl. No.: 395,556

[30] Foreign Application Priority Data
Sept. 26, 1972 Great Britain.................... 44311/72
May 23, 1973 Great Britain.................... 24732/73

[52] U.S. Cl............................... 303/21 F, 188/170
[51] Int. Cl............................................... B60t 8/12
[58] Field of Search ...... 188/170, 181 A; 303/21 A, 303/21 F, 21 FM, 21 FS, 21 SV, 21 CG

[56] References Cited
UNITED STATES PATENTS
3,682,514   8/1972   Oberthur........................... 303/21 F

*Primary Examiner*—Duane A. Reger
*Attorney, Agent, or Firm*—Scrivener, Parker, Scrivener and Clarke

[57] ABSTRACT

An anti-skid braking system for vehicles includes a brake actuator having two actuating members, the first applying the brake hydraulically during normal service braking, and the second spring biassed to engage the first actuating member but normally held out of engagement by hydraulic fluid under the control of a parking valve. The system also includes an hydraulicaly operated pressure modulator which modulates the fluid pressure acting on the first actuating member in the event of a skid, the same source of pressure fluid supplying both the modulator and the second actuating member. The actuator and the modulator may be combined in a single assembly.

6 Claims, 18 Drawing Figures

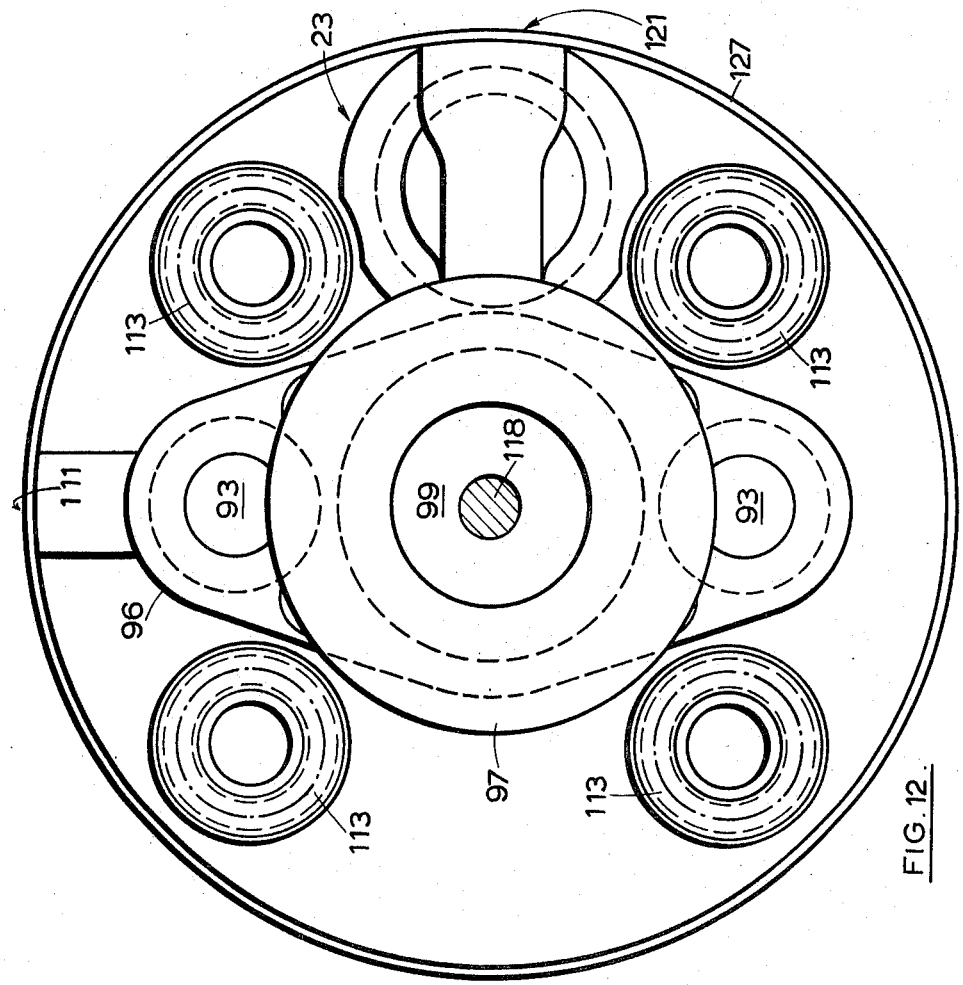
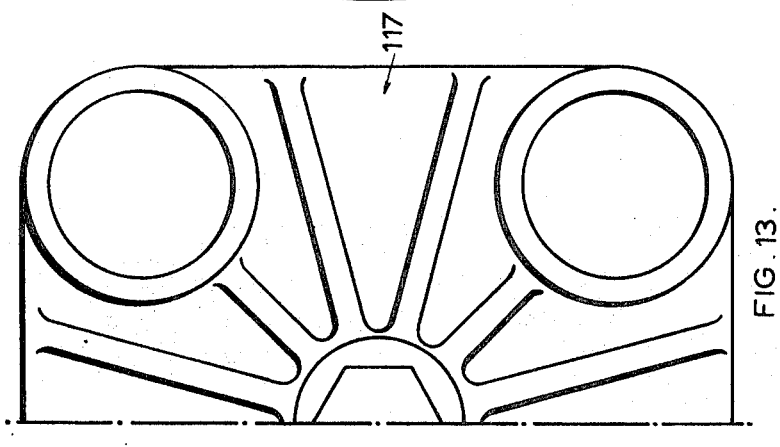

FLUID PRESSURE BRAKING FOR VEHICLES

This invention relates to fluid pressure braking systems for vehicles of the kind comprising an actuator for a wheel brake, means for applying fluid under pressure to the actuator, and skid control means sensitive to the deceleration of the braked wheel for reducing the pressure applied to the actuator when the deceleration exceeds a threshold value.

In known systems of this kind the actuator is fluid operated for service braking only, the brake being applied mechanically for parking purposes.

According to the present invention in a fluid pressure braking system of the kind set forth the actuator includes two actuating members, the first member subjected to fluid pressure controlled by the applying means and the skid control means, and the second member spring-biassed to engage the first member to apply the brake but normally held out of engagement by fluid pressure controlled by a parking valve which is operated to apply the wheel brake for parking purposes.

The first and second actuating members may be subjected to hydraulic pressure or pneumatic pressure, or one may be subjected to hydraulic pressure and the other to pneumatic pressure.

The skid control means may include pressure modulating means which isolates the actuator from the applying means and reduces the pressure applied to the actuator on receipt of a signal from deceleration sensing means. In braking systems using pneumatically operated brakes the modulating means may include a valve assembly for isolating a brake and reducing the applied pressure.

Preferably both the first and second actuating members are subjected to hydraulic pressure and the modulating means includes an hydraulically operated modulator, one source of hydraulic fluid under pressure supplying both the modulator and the second actuating member.

In a braking system having brakes on two front wheels and on two rear wheels, the brakes on all four wheels may be controlled by the skid control means. Preferably actuators according to this invention are used at least for the brakes on the rear wheels. Actuators according to this invention may be used for the front and rear wheel brakes.

The modulators may be located remote from the actuators but preferably each actuator includes a modulator in a single assembly.

The modulating means may also include a control valve responsive to the skid sensing means and controlling the supply of hydraulic fluid to a modulator. The control valve may be located remote from the combined actuator/modulator assembly but, preferably, the control valve is included in the actuator assembly.

The applying means may be a hydrostatic master cylinder, an hydraulically or pneumatically boosted master cylinder, or a power valve assembly.

Examples of braking systems according to this invention and examples of actuator assemblies for use in the braking systems are illustrated in the accompanying drawings in which, FIG. 1 is a layout of an hydraulic braking system including the actuator assemblies;

FIG. 12 is a section on the lines 12—12 in FIG. 9;

FIG. 13 is a view of half the plate at the end of the assembly opposite to the end shown in FIG. 8;

Figure 1:
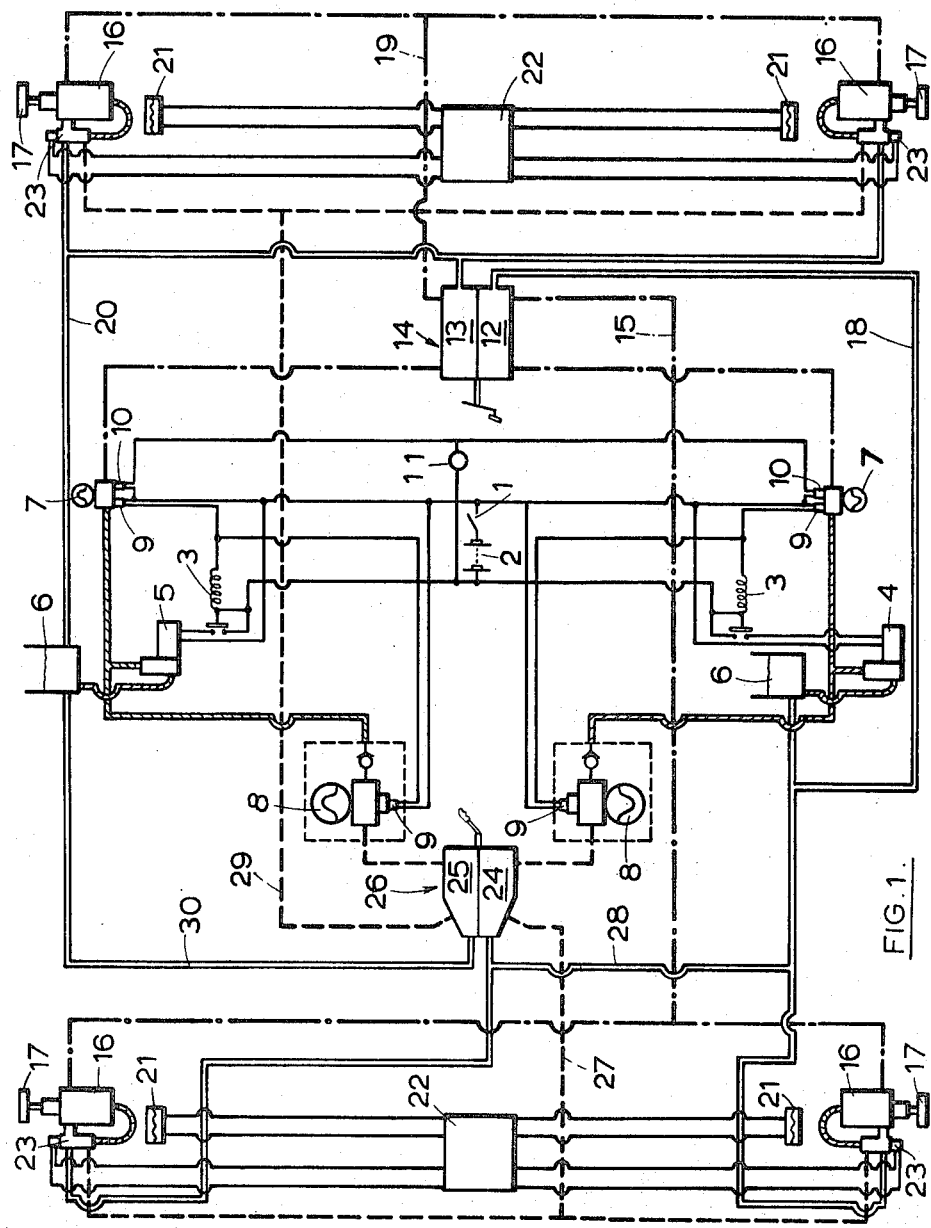

In the layout illustrated in FIG. 1 the vehicle ignition switch 1 is connected to an electrical circuit including the vehicle battery 2, two relays 3, a pump 4 supplying pressure fluid for the front brakes and a pump 5 supplying pressure fluid for the rear brakes. Each pump 4 and 5 draws hydraulic fluid from a reservoir 6 and supplies an accumulator 7 for pressure braking fluid and an accumulator 8 for skid control fluid. Each accumulator 7 and 8 is provided with a pressure switch 9 for operating the pumps 4 and 5 to maintain a predetermined pressure in the accumulator. The accumulator 8 can be arranged to be at a lower pressure than the accumulators 7. The accumulators are also provided with low pressure warning switches 10 connected in a circuit with a warning device, such as lamp 11.

Each accumulator 7 is connected to one of two separate pressure spaces 12 and 13 in a pedal-operated dual control valve 14. The pressure space 12 is connected through pipeline 15 to actuator assemblies 16 for actuating front wheel brakes 17 and is connected through pipeline 18 to reservoir 6 for pump 4. The pressure space 13 is connected through pipeline 19 to actuator assemblies 16 for actuating rear wheel brakes 17 and is connected through pipeline 20 to the second reservoir 6. On operation of the control valve 14 connections to the reservoir lines 18 and 20 are closed and pressure fluid supplied to the actuator assemblies 16 through lines 15 and 19.

When the brakes are applied the deceleration of each wheel is sensed by an sensor 21. The outputs from the sensors 21 on the front wheels and the rear wheels respectively are fed into control modules 22. When the output from one sensor 21 exceeds a predetermined threshold value its control module 22 converts the output into a signal which is supplied to a solenoid control valve 23 for an actuator assembly 16 associated with that control module.

Each accumulator 8 is connected to one of two separate pressure spaces 24 and 25 in a hand-operated dual control valve 26. The pressure space 24 is connected through pipeline 27 to solenoid control valves 23 for the front wheels and is connected through pipeline 28 to reservoir 6 for pump 4. The pressure space 25 is connected through pipeline 29 to solenoid control valves 23 for the rear wheels and is connected through pipeline 30 to the second reservoir 6. On operation of control valve 26 connections to be pipelines 27 and 29 are closed and pressure fluid from solenoid control valves 23 is exhausted to reservoirs 6 through pipelines 28 and 30.

Each solenoid control valve 23 is adapted to control the supply of hydraulic fluid from an accumulator 8 to an actuator assembly 16 for modulating the braking effort applied to the wheel brake by the actuator assembly in response to the signal received from the control module 22 to which the solenoid is connected.

Figure 2:
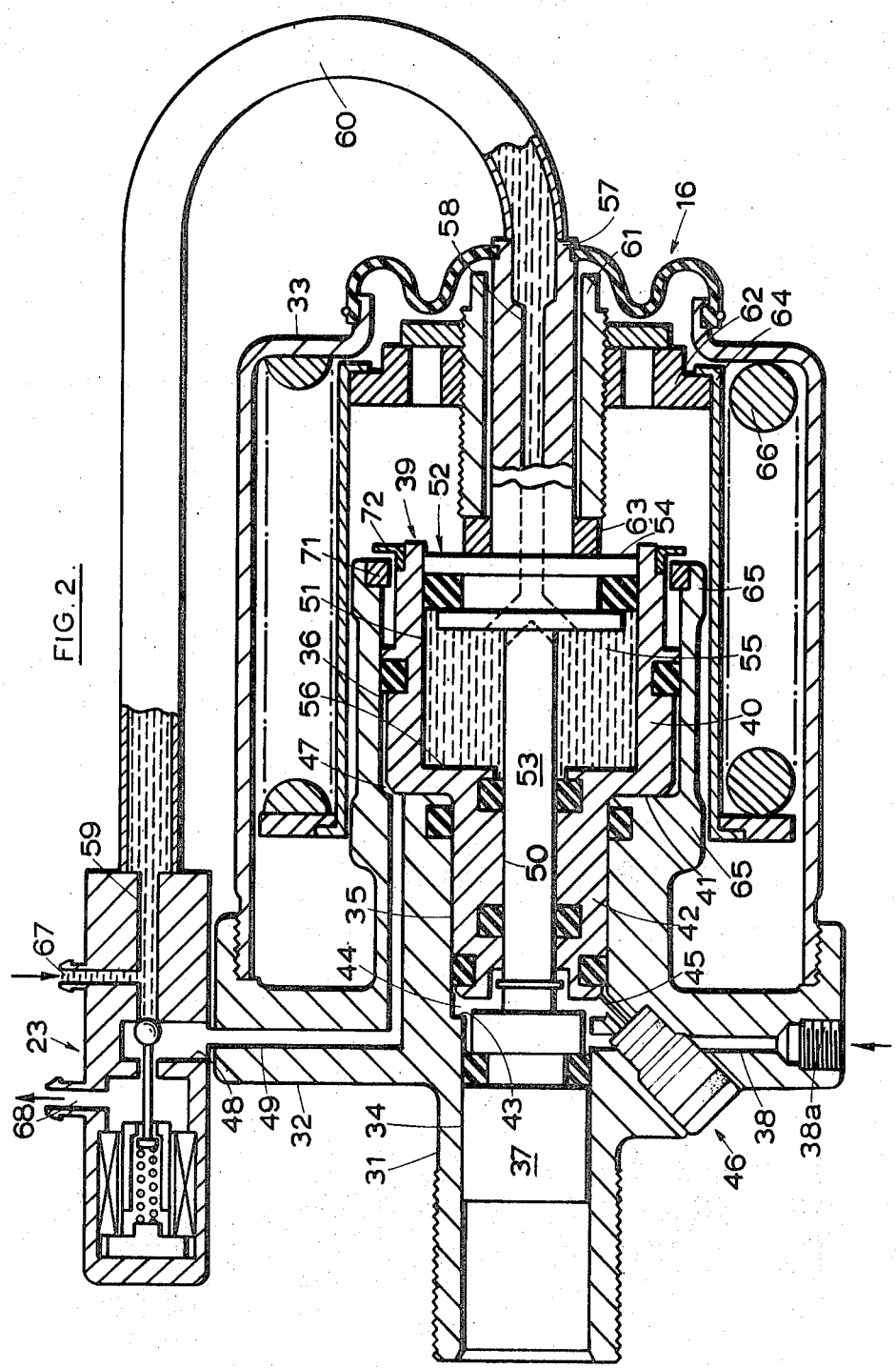
FIG. 2 is a longitudinal section through a first embodiment of the actuator assembly included in the system of FIG. 1.

The actuator assembly 16 of FIG. 1 is shown in more detail in FIG. 2 and comprises a two-part housing, a substantially cylindrical body 31 having a radial flange 32, and a sleeve 33 screwed to the flange 32 to surround the body. The body is formed with a through bore having three stepped bore portions 34, 35 and 36 of progressively increasing diameter. The smallest bore portion 34 terminates at one end of the body which is adapted to be secured to a wheel brake or to a slave cylinder of a wheel brake. An actuating piston 37 (the first) works in bore portion 34 and is adapted to be connected to the operating member of a wedge brake or to pressurise fluid in a slave cylinder. A radial passage 38 through the flange 32 leads from the bore portion 34 to an inlet port 38a for connection to one of the pipe lines 15 or 19 from the pedal-operated dual control valve 14.

A stepped modulator piston 39 works in the bore portions 35 and 36 and is arranged such that when the inner end of the piston portion 40 of greater diameter is in abutment with the step 41 at the change in diameter of the cylinder bore, the lesser diameter piston portion 42 is spaced from the step 43 at the change in diameter between bore portions 34 and 35. A chamber 44 (the third) is formed at the step 43 and the spring-loaded valve member 45 of an inlet valve 46 controlling passage 38 extends through an inclined drilling into chamber 44. When the modulator piston 39 abuts step 41, piston portion 42 engages valve member 45 to hold the inlet valve 46 open. When the modulator piston retracts valve 46 closes cutting off the supply of pressure fluid to chamber 44.

A second chamber 47 is formed at the step 41 and is connected to an outlet port 48 in control valve 23 through a passage 49 extending axially through body 31 and then radially through flange 32.

The modulator piston 39 itself has a stepped axial bore, the smaller bore portion 50 in the piston portion 42 and the larger diameter bore portion 51 in the piston portion 40. A stepped second actuating piston 52 works in this stepped bore, the smaller diameter portion 53 terminating in the first chamber 44 and the larger diameter portion 54 closing a chamber 55 (first) formed at the step 56 between the bore portions 50 and 51.

An axial rod 57 extends outwardly from the second actuating piston 52 and an axial passage 58 through the rod 57 and piston 52 leads into chamber 55. The outer end of passage 58 is connected to a transfer port 59 in solenoid valve 23 by a flexible hose 60. The rod 57 is slidably guided in a tube 61 screwed into and end plate 62 and a thrust washer 63 on the rod 57 acts between the tube 61 and piston 52. End plate 62 is secured to a cage 64 which surrounds body 31 and slides on bearing surfaces 65 on the exterior of body 31. A spring 66 acts between cage 64 and housing sleeve 33.

The solenoid control valve 23 has an inlet port 67 directly connected to the transfer port 59 and adapted to be connected to lines 27 or 29 from the hand operated dual control valve 26. The valve 23 also has a reservoir port 68 for connection to reservoir line 28 or 30.

Figure 3:
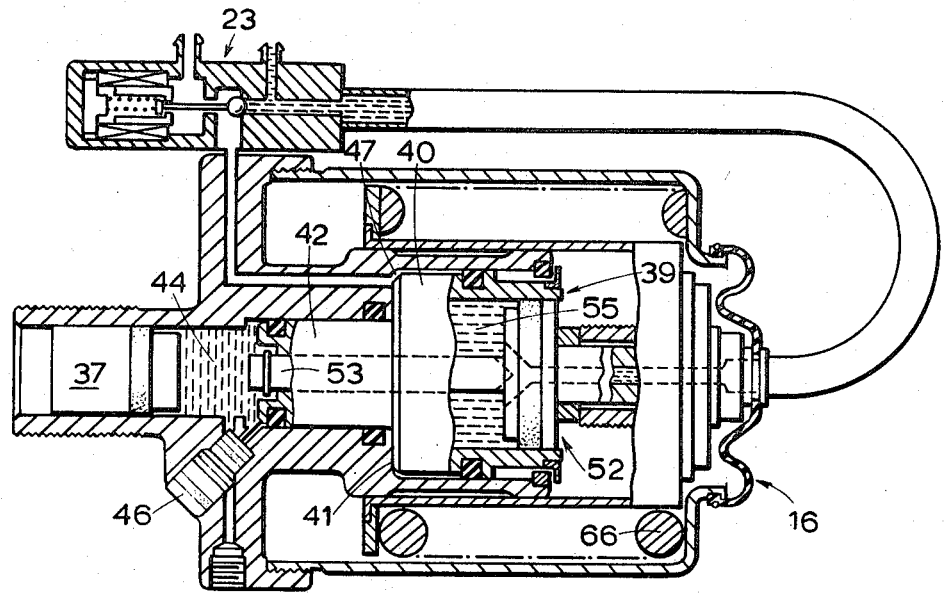
FIGS. 3 to 6 are sections similar to FIG. 2 showing the actuator assembly in different operational positions.

During normal operation with the hand brake off the relative positions of the parts of the actuator assembly are as shown in FIG. 2, pressure fluid in chamber 55 keeping the second actuator piston 52 retracted in opposition to the force in spring 66 and keeping the modulator piston 39 in abutment with step 41. On operation of the pedal valve 14 pressure fluid is supplied to the first chamber 44 to advance the first actuating piston 37 to apply the wheel brake as shown in FIG. 3.

Figure 4:
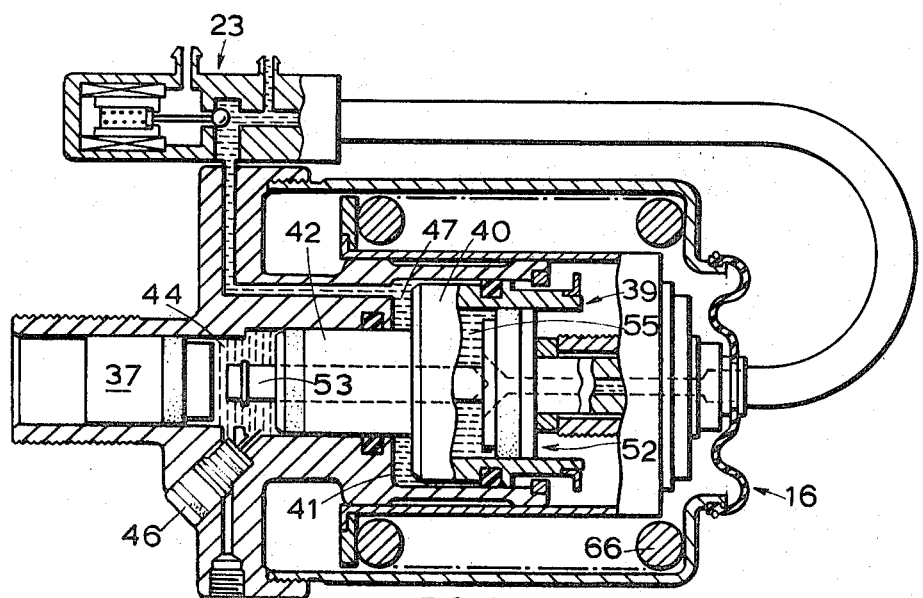

When the deceleration of a wheel exceeds the predetermined threshold value the solenoid of valve 23 is energised to close the connection between second chamber 47 and reservoir, and to allow pressure fluid from chambers 55 and accumulator 8 into chamber 47. Modulator piston 39 retracts as the differential pressure across the piston portion 40 is equalised and the braking pressure in chamber 44 acts on the exposed end of piston portion 42. Conveniently the area of piston portion 40 exposed to the pressure in chamber 47 is greater than the area exposed to the pressure in chamber 55. Also the second actuator piston 52 advances into chamber 44 so the actuator assembly assumes the position shown in FIG. 4. Pressure in chamber 55 is sufficient to limit forward movement of the piston 52. Inlet valve 46 shuts to isolate chamber 44 from the applied pressure and since the volume of the modulator piston is greater than the volume of the second actuating piston, the pressure in chamber 44 falls and the first actuating piston 37 retracts to relieve the braking force.

Figure 5:
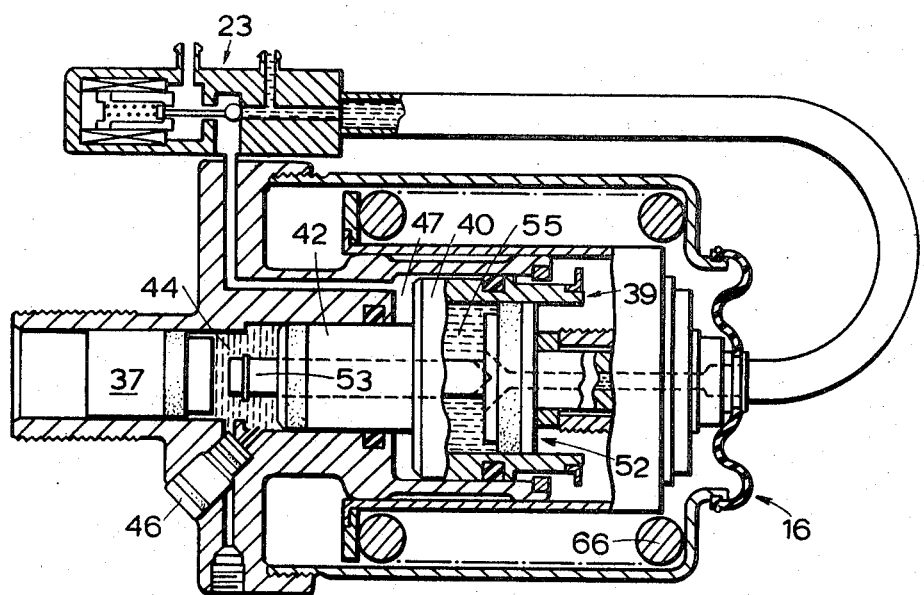

FIG. 5 shows the solenoid valve 23 shut as the skid signal terminates, exhausting chamber 47 to reservoir and allowing chamber 55 to repressurise.

Figure 6:
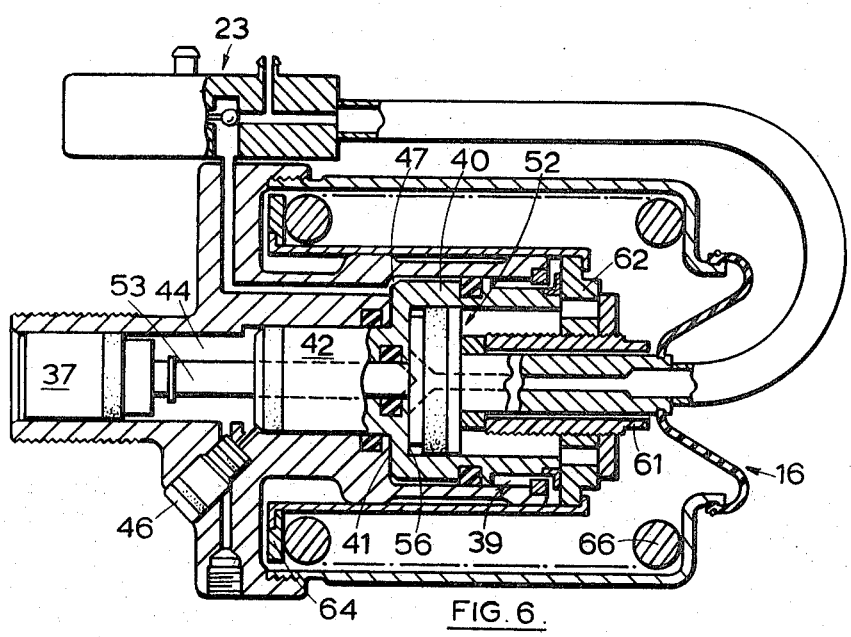

On operation of the hand valve 26, chamber 55 is exhausted to reservoir and spring 66 advances cage 64, end plate 62, tube 61 and second actuating piston 52 until piston 52 abuts step 56, also keeping the modulator piston 39 in abutment with step 41. As shown in FIG. 6, the second actuating piston 52 engages the first actuating piston 37 to hold it in a brake applied position. The position of FIG. 6 will occur on failure of the fluid supply in accumulator 8. The brake can be released by unscrewing tube 61 from plate 62.

Figure 7:
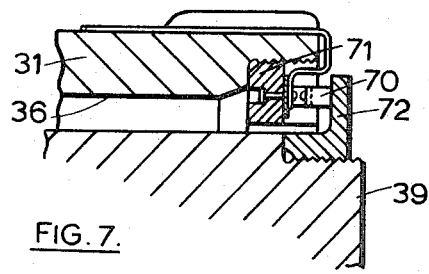
FIG. 7 is an enlarged detail of FIG. 2.
Figure 8:
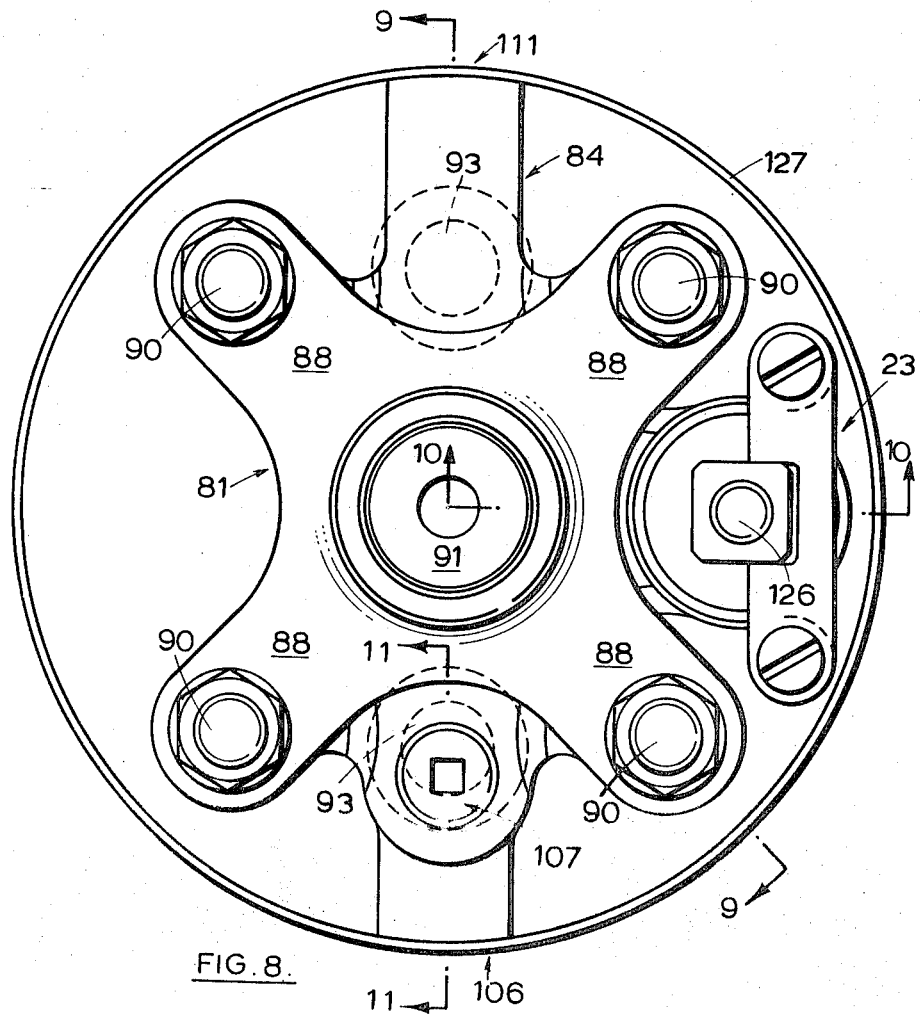
FIG. 8 is an end view of a second embodiment of the actuator assembly.

In our Gr. Britian Patent Applications 44272/71, 55159/71 and 16530/72 (cognate) we disclosed an electrical switch arranged between two parts of a modulator which move relatively to each other when the modulator is actuate, movement of the parts operating the switch. In FIG. 7 is shown a switch 70 located in an annular ring 71 in the end of the body 31 of the actuator assembly surrounding the bore portion 36. An annular L section ring 72 in the end of the modulator piston 39 serves as a bridging piece for the switch contacts. The function of the Switch 70 is set out in the above Application.

The second embodiment of the actuator assembly shown in FIGS. 8–13 has a two-part housing, a substantially cylindrical first part 81 having a stepped through bore 82, 83 and a second part 84 also having a stepped through bore 85, 86, the larger diameter bore 85 receiving one end of the first housing part 81. A radial flange 87 arround the housing part 81 acts as an abutment for the housing part 84 and is shaped to provide four angularly spaced radial arms 88 which register with four arms 89 extending radially from housing part 84. A bolt 90 through each pair of arms 88, 89 serves to clamp the two housing parts together.

An actuating piston 91 works in the larger diameter bore 82 of the housing part 81 which is adapted to be secured to a wheel brake, the piston 91 being connected to the operating member of the brake.

On each side of the bore 86 in the second housing part 84 are two blind bores 92 arranged so that the axes of the bores are parallel and co-planar. In each of the blind bores 92 works a modulator piston 93 (the second) which extends through a seal 94 housed in a counterbore in a plane face of the housing and through a corresponding hole 95 in a seal retaining plate 96 secured to the housing. The ends of the modulator pistons 93 are engaged by a radial flange 97 extending from a modulator piston 98 (the first) working in the lesser diameter bore 86 in housing part 84.

A stepped second actuating piston 99 works in a correspondingly stepped bore 100, 101 in the (second) modulator piston 98, the lesser diameter bore 100 being of the same diameter and coaxial with the bore 83 in the housing part 81. Two seals 102 in a counterbore of bore 83 are held apart by a spacer 102 secured to the housing by grub screw 100 provided with an axial bleed passage 105.

Figure 9:
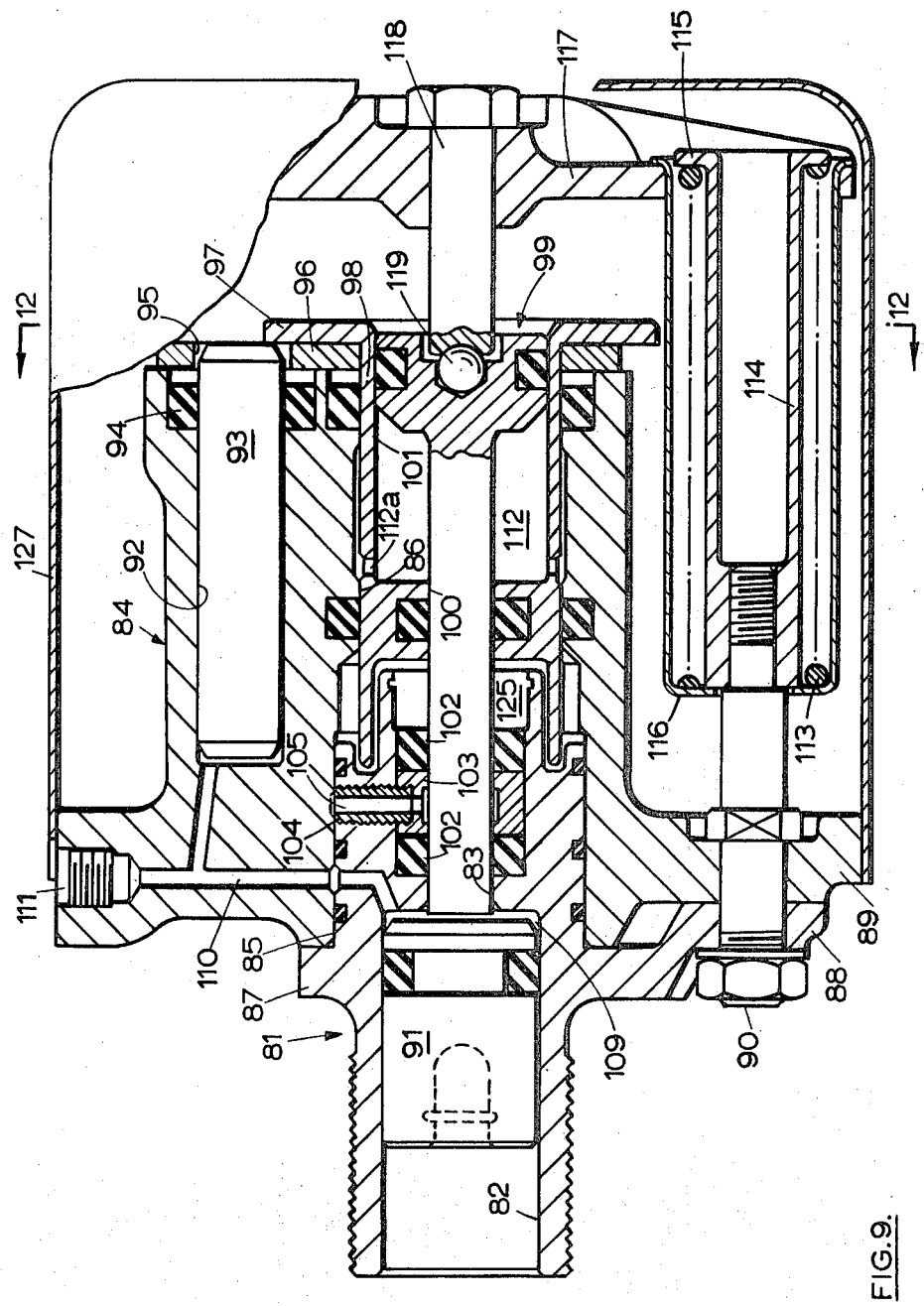
FIG. 9 is a section on the lines 9—9 of FIG. 8.
Figures 10, 11:
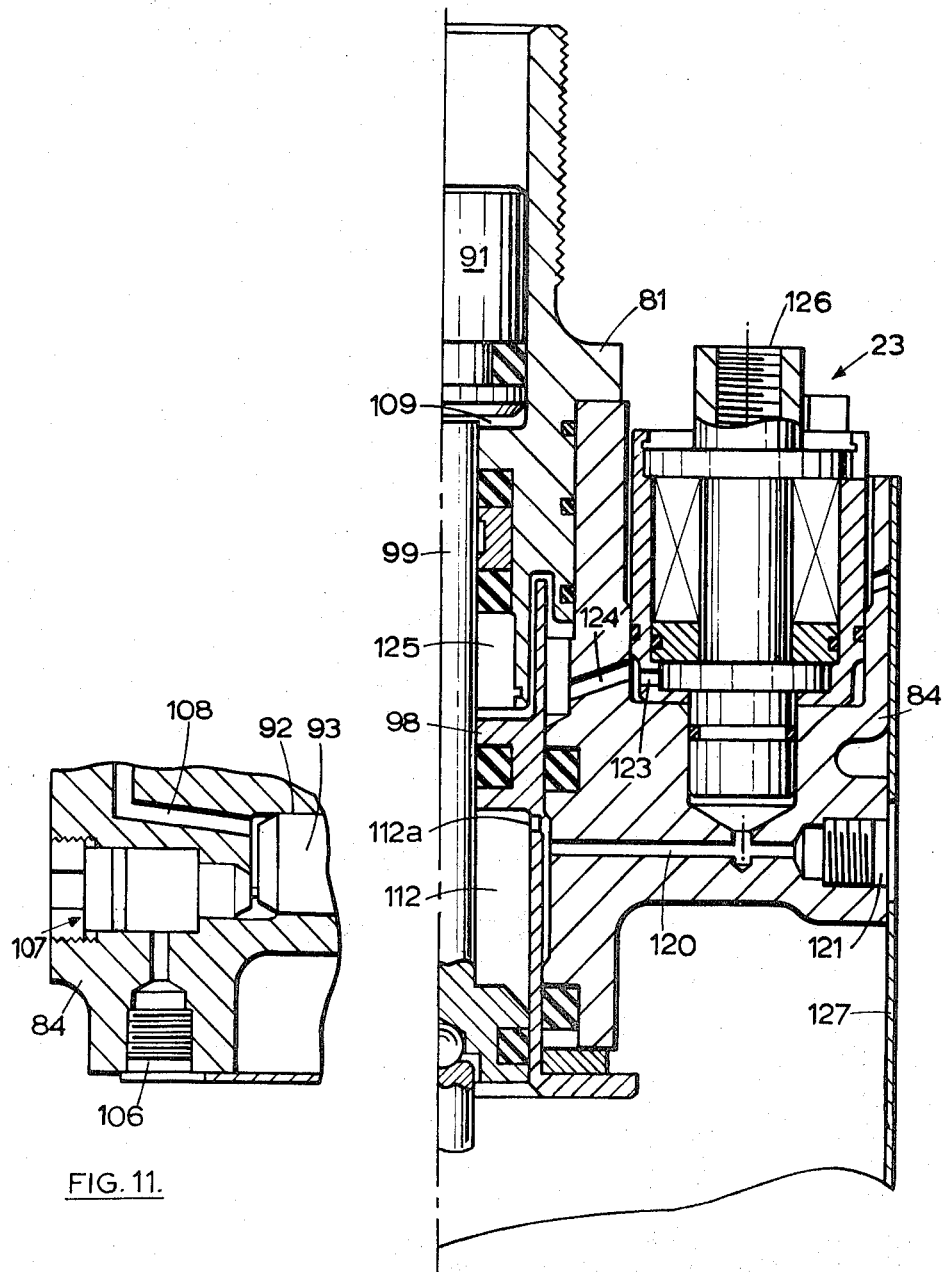
FIG. 10 is a part section on the lines 10—10 of FIG. 8.
FIG. 11 is a part section on the lines 11—11 of FIG. 8.

A radial inlet port 106 (FIG. 11) in the second housing part 84 is connected to an inlet valve 107 controlling fluid flow into a bore 92, the valve being normally held open by modulator piston 93 (not shown in FIG. 9). A passage 108 through both housing parts leads from the bore 92 to a chamber 109 (the third) behind actuating piston 91. Another passage 110 (FIG. 9) through both housing parts connects chamber 109 with the other bore 92 and with an outlet port 111. The inlet port 106 is adapted to be connected to one of the pipelines 15 or 19 from control valve 14 and the outlet port 111 is adapted to be connected to the inlet of a further actuator 16 of another brake. Alternatively the outlet can be plugged. Thus when the control valve 14 is operated hydraulic fluid enters space 109 to move piston 91 and actuate the wheel brake.

Pistons 93 are normally held in their advanced positions by fluid pressure in the chamber 112 (the first) formed between modulator piston 98 and the second actuating piston 99. Radial openings 112a in piston 98 connect chamber 112 to an annular recess in bore 86, the same fluid pressure holding the second actuating piston in a retracted position against the force of four springs 113. Each spring 113 is coiled around a guide 114 screwed into a rearwardly extending portion of a clamping bolt 90, the spring acting between a radial flange 115 at the rear end of the guide and the forward end of a cage 116 is slidably mounted on the bolt. The rear end of the cage 116 is mounted in a ribbed end plate 117 which is itself retained on a threaded axially extending bolt 118 screwed into the end of the second actuating piston 99. A captive ball 119 in the end of piston 99 provides a bearing for the end of bolt 118.

High pressure fluid is normally admitted into chamber 112 via a passage 120 (FIG. 10) in the housing 84 connecting bore 86 with an inlet port 121 of a solenoid control valve 23 secured to the housing part 84. The solenoid valve 23 controls the flow of fluid to an outlet 123 communicating with a passage 124 in the housing 84 leading to a chamber 125 (the second) formed between modulator piston 98 and the end of housing part 81. A second outlet 126 from solenoid valve is adapted to be connected to reservoir line 28 or 30. In the normal state of the valve the first and second outlets are in communication. A cover 127 attached to housing part 84 surrounds the springs 113 and the solenoid valve 23.

During normal operation of the brakes the relative positions of the parts of the actuator assembly are as shown in FIG. 9, pressure fluid in chamber 112 keeping the second actuator piston 99 retracted in opposition to the force in springs 113 and keeping the first modulator piston 98 in abutment with the second modulator pistons 93 to hold the inlet valve 107 open.

When the deceleration of the braked wheel exceeds the predetermined threshold value the solenoid valve 23 is energised to close the connection between the chamber 125 and reservoir, and to allow pressure fluid from chamber 112 and inlet 121 into chamber 125. Modulator piston 98 retracts as the differential pressure across it is equalised and as braking pressure acting on pistons 93 acts on piston 98 through flange 97. The second actuating piston 99 will advance into space 109 but the braking pressure in this space will be sufficient to limit its forward movement. Retraction of pistons 93 shuts the inlet valve 107 to isolate space 109 from the applied pressure and the increase of fluid volume in bores 92 causes a fall in braking pressure.

In the event of a pressure failure in the anti-skid system or when the hand brake is applied, pressure in chamber 112 falls and the second actuating piston 99 moves forwardly to engage the first actuating piston 91 and apply the brake. In order to release the brake in this condition without the assistance of fluid pressure, the bolt 118 is rotated to allow the actuating piston 99 to retract without recompressing the springs 113. The ball 119 facilitates rotation of bolt 118.

Figure 14:
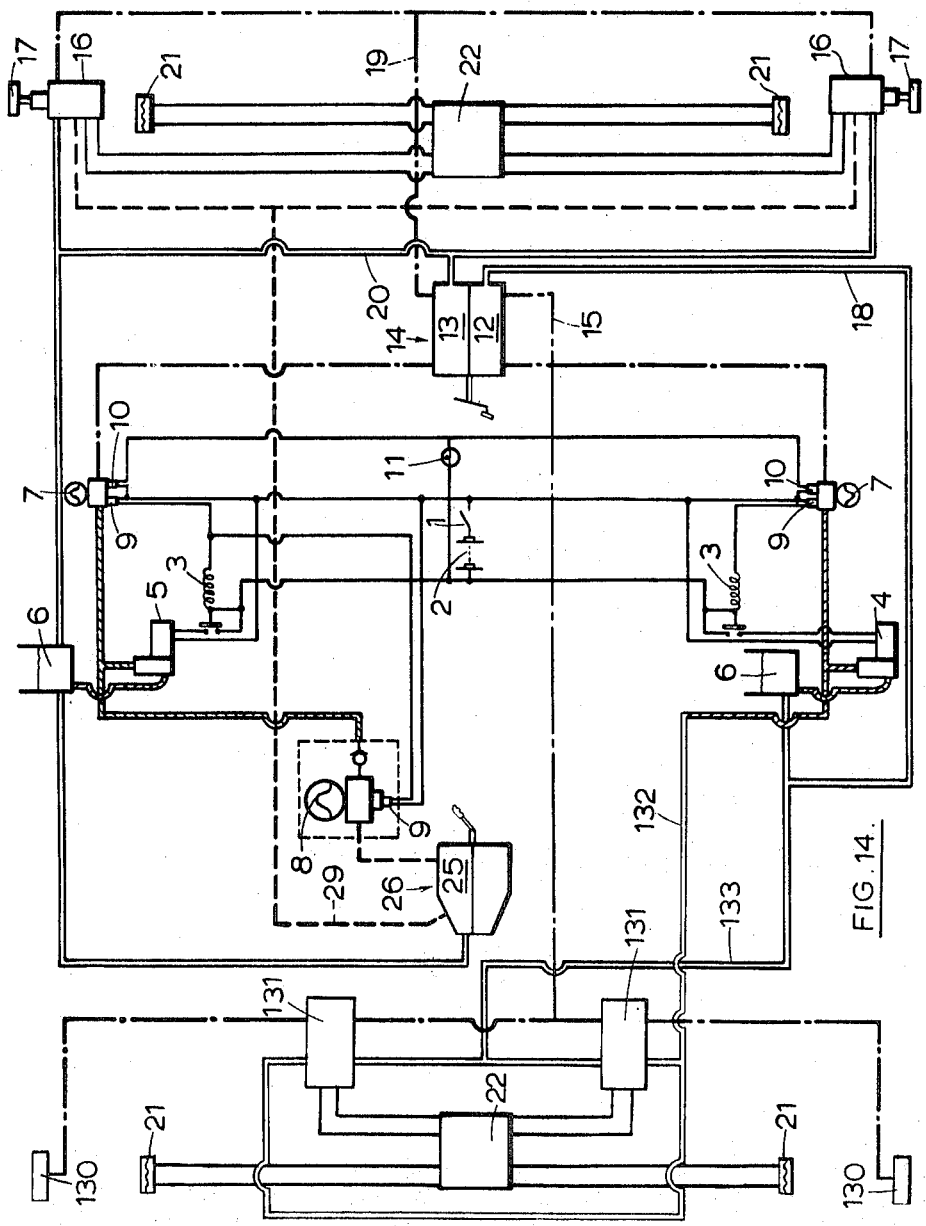
FIGS. 14 to 16 are layouts of three modifications of the braking system shown in FIG. 1.

The braking system shown in FIG. 14 is a modification of the system of FIG. 1 and the same reference numerals have been used for equivalent parts. The actuator assemblies 16 on the front wheels have been replaced by disc brake actuators 130 and hydraulic modulator control valve assemblies 131 in the supply line 15. Since actuators 130 have no hydraulic parking facility, pressure space 24 in parking valve 26 and its associated connections 27 and 28 are no longer required. Modulators 131 are supplied by pipeline 132 from pump 4 and are connected to reservoir 6 by pipeline 133. Control valves 23 are included in the actuator assemblies 16.

Figure 15:
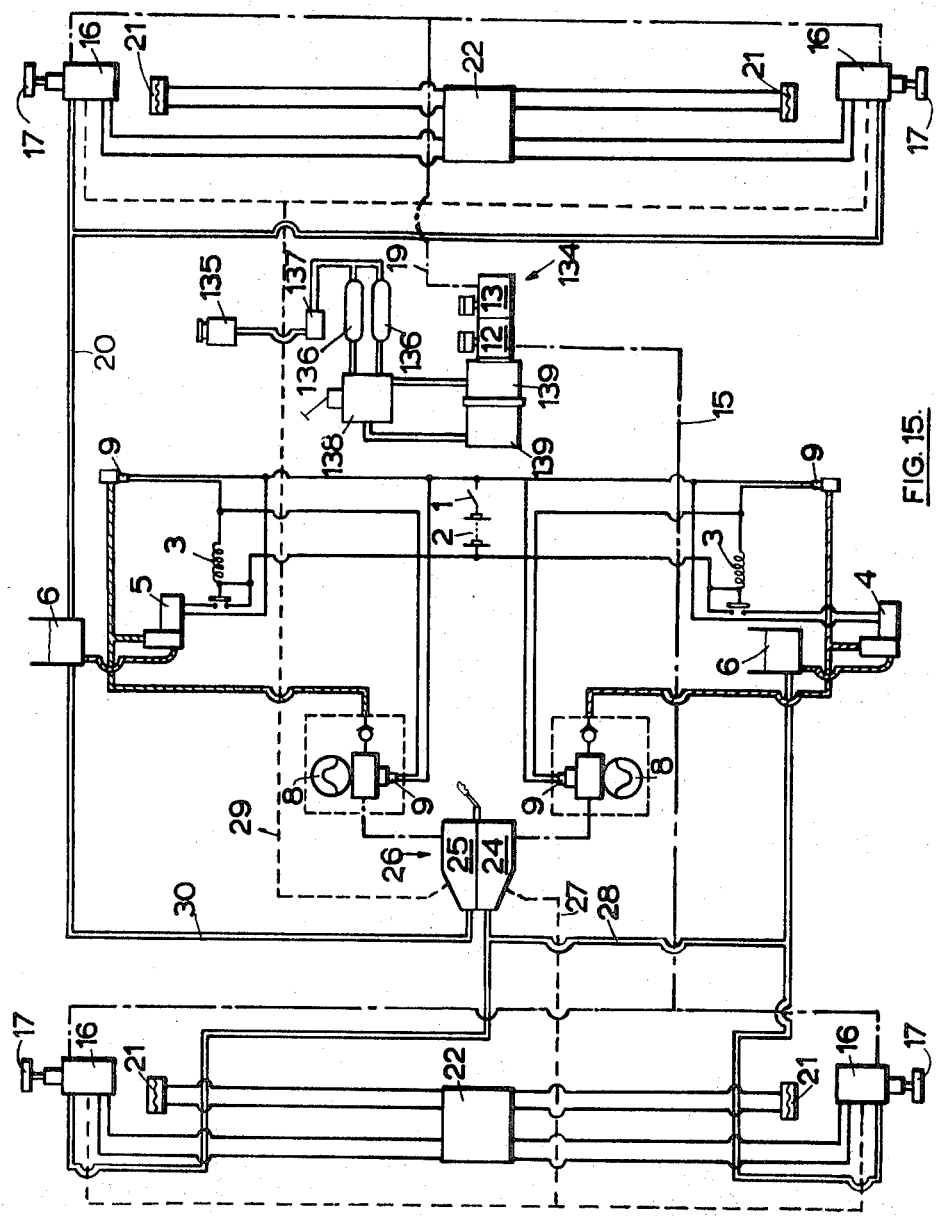

In the modification of FIG. 1 shown in FIG. 15 the pedal operated power valve 14 has been replaced by a pneumatically boosted tandem hydrostatic master cylinder 134. An air compressor 135 supplies two accumulators 136 via an unloader valve 137, and a dual treadle valve 138 controls the supply of compressed air from the accumulators to two air booster chambers 139 for the master cylinder.

Figure 16:
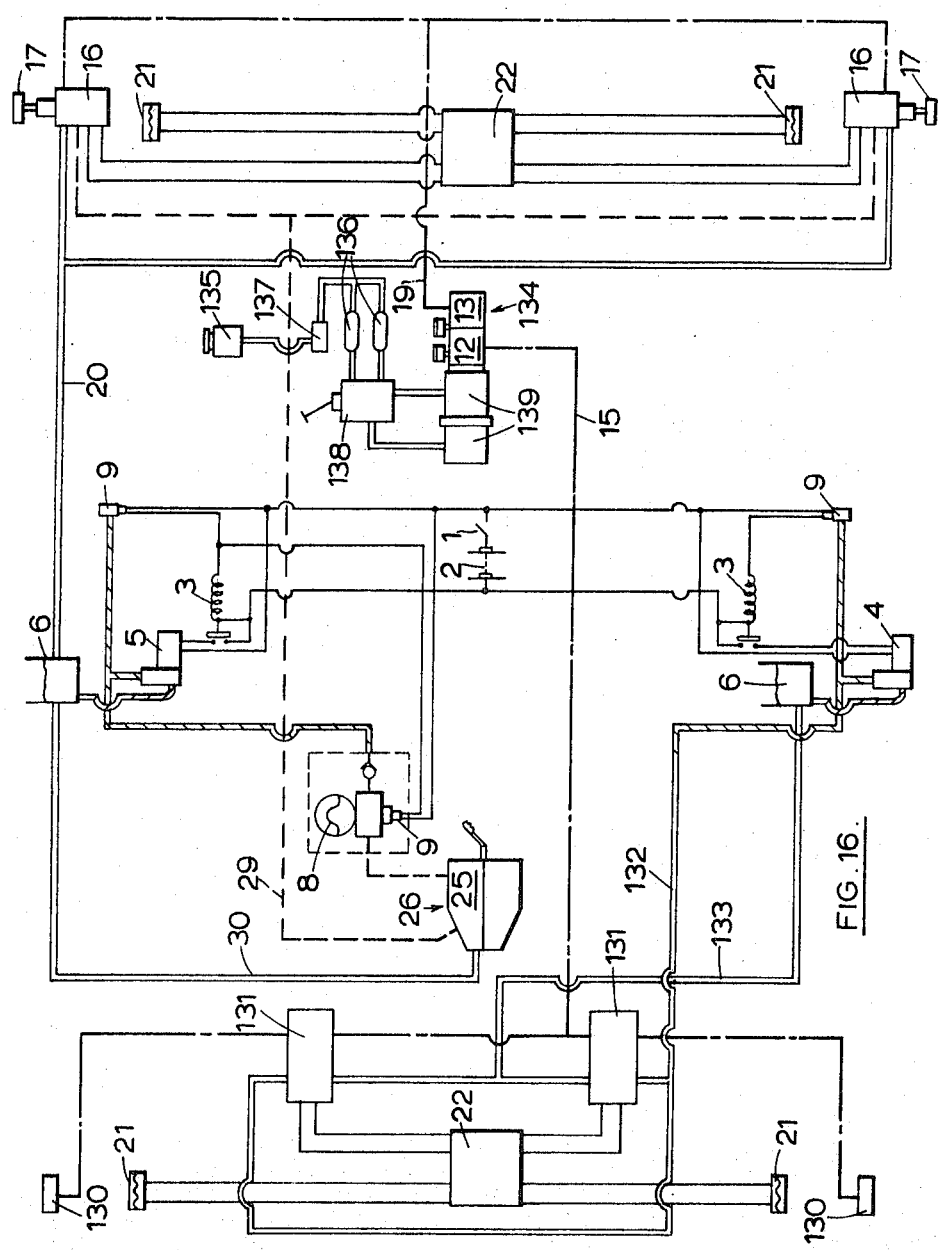

The system of FIG. 16 is a combination of the systems of FIGS. 14 and 15 i.e. disc brakes 130 on the front wheels and a pneumatically boosted master cylinder 134.

Figure 17:
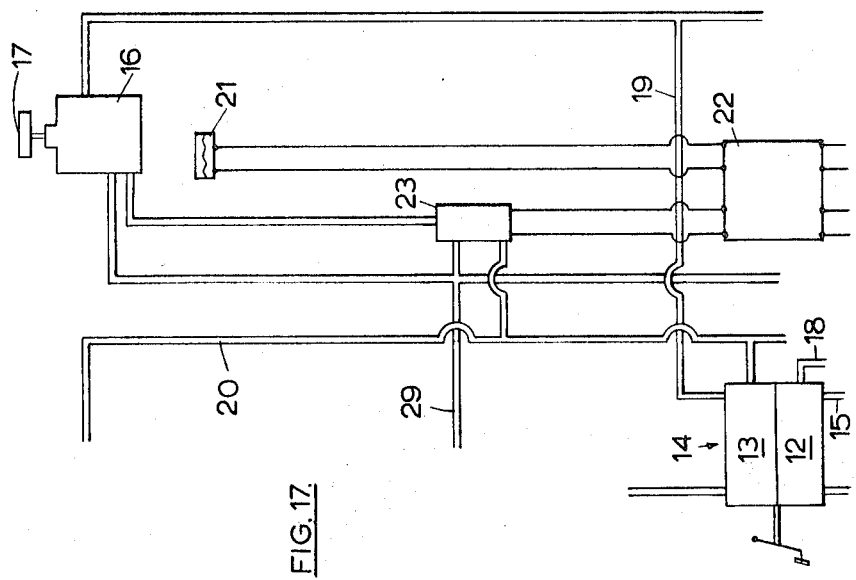

FIG. 17 shows a modified arrangement for one rear wheel brake 17 which is applicable to the system of FIG. 14. It will be appreciated that although a power valve 14 is illustrated, it could be replaced by the master cylinder 134 and so with minor adjustments the modified arrangement is applicable to any of the systems of FIGS. 1, 15 and 16. FIG. 17 shows the control valve 23 located remote from the actuator assembly 16.

Figure 18:
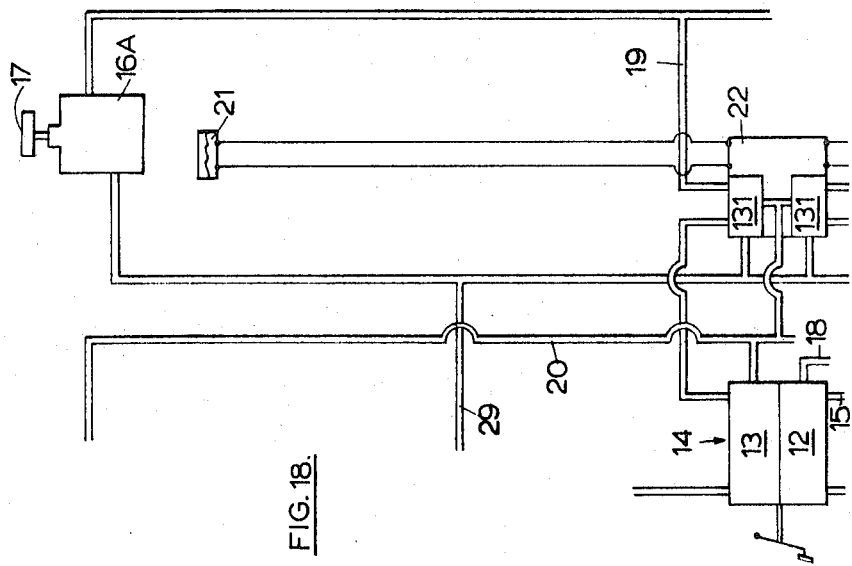
FIGS. 17 and 18 are two further modifications applicable to any of the systems of FIGS. 1 and 14 – 16.

In the modification of FIG. 18, which is a rear wheel detail similar to FIG. 17, there is a combined service and parking brake actuator and the applied pressure for service braking supplied through line 19 is modulated by a remotely located modulator/control valve assembly combined with the control module 22.

We claim:

1. A fluid pressure braking system for vehicles comprising an actuator for a wheel brake, means for applying fluid under pressure to said actuator, and skid control means sensitive to the deceleration of the braked wheel for reducing the pressure applied to the actuator when the deceleration exceeds a threshold value, wherein said actuator includes two actuating members, the first member subjected to fluid pressure controlled by said applying means and the skid control means, and the second member spring-biassed to engage said first member to apply the brake but normally held out of engagement by fluid pressure controlled by a parking valve which is operated to apply the wheel brake for parking purposes.

2. A braking system as in claim 1 wherein said first and second actuating members are subjected to hydraulic fluid under pressure, and the skid control means includes an hydraulically operated pressure modulator which isolates said actuator from said applying means and reduces the pressure applied to said first actuating member, one source of hydraulic fluid under pressure supplying said modulator and said second actuating member.

3. A braking system as in claim 2 wherein said actuator is fitted to each of two rear wheel brakes on opposite sides of the vehicle.

4. A braking system as in claim 3 wherein said actuator is fitted to each of two front wheel brakes on opposite sides of the vehicle.

5. A braking system as in claim 2 wherein said actuator and said modulator are combined in a single assembly.

6. A braking system as in claim 5 wherein said skid control means further includes skid sensing means, and a control valve responsive to a signal from said skid sensing means and controlling the supply of hydraulic fluid to said modulator, said control valve being included in said actuator assembly.

* * * * *